July 12, 1932.    G. GRANDJEAN    1,867,260
GUARD FOR AUTOMATIC LUBRICATING JOURNAL BOXES
Filed Feb. 9, 1929
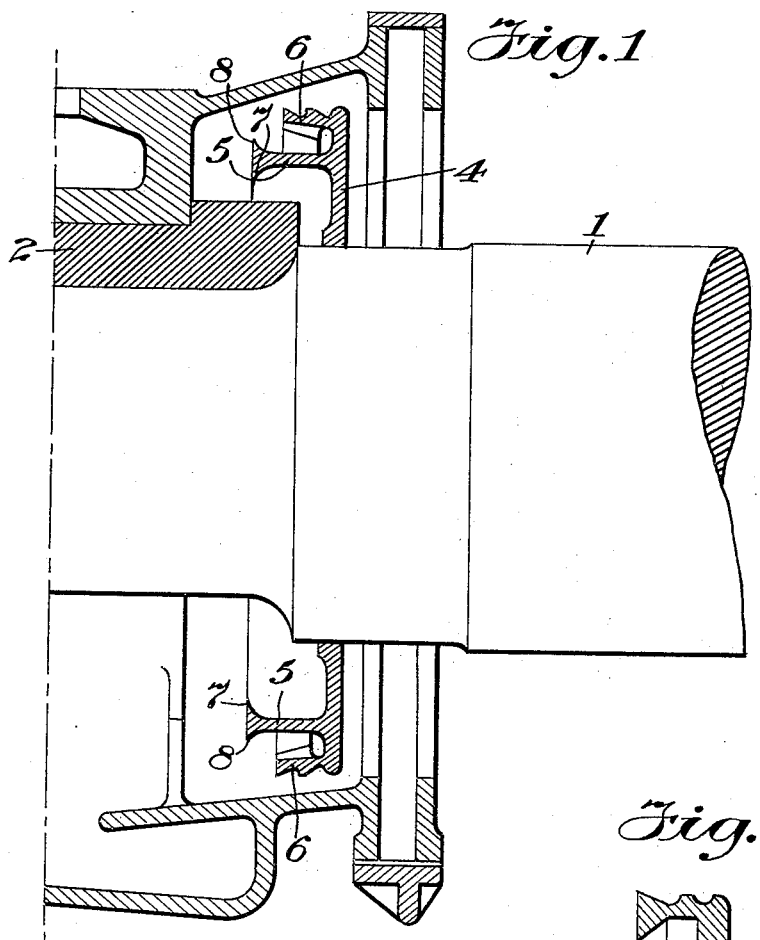
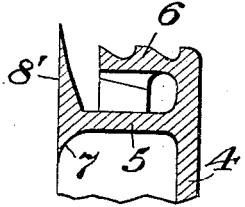
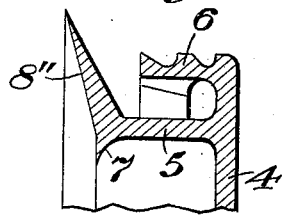
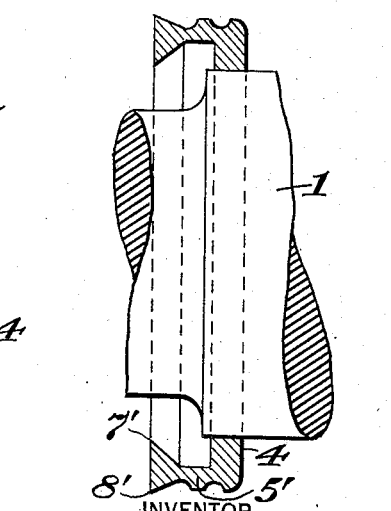
INVENTOR
Georges Grandjean
BY
HIS ATTORNEY Patented July 12, 1932

1,867,260

UNITED STATES PATENT OFFICE

GEORGES GRANDJEAN, OF LES FORGETS, ISLE ADAM, FRANCE, ASSIGNOR TO ISOTHERMOS CORPORATION OF AMERICA, OF NEW YORK, N. Y., A CORPORATION OF DELAWARE

GUARD FOR AUTOMATIC LUBRICATING JOURNAL BOXES

Application filed February 9, 1929, Serial No. 338,860, and in Switzerland November 14, 1928.

The present invention relates to certain new and useful improvements in devices for preventing the leakage of lubricant to the exterior of axle boxes and also for effecting the separation of impurities from the lubricant by centrifugal action, the device being of the general character of that shown in the prior Eveno Patent No. 1,653,950, including an annular disk adapted to be secured to the axle adjacent the bearing of the latter, said disk having one or more annular flanges normal to the face thereof which are directed toward the bearing, the said flanges being concentric with the disk and of different diameters to provide an annular chamber between them, the inner flange preferably being of greater width than the outer flange and provided at its inner edge with an inwardly extending lip which serves to retain any solid material entrained in the lubricant and prevent such impurities reaching the bearing, the impurities being projected against the inner peripheral surface of the inner flange by centrifugal action, the lubricant eventually overflowing the annular lip on the flange and returning to the well of the journal box whence it is picked up by the usual rotary blade and delivered to the top of the journal.

The invention is illustrated in the accompanying drawing, in which:—

Fig. 1 is a partial axial section of a journal box and axle with the improved oil separating and check ring applied thereto.

Fig. 2 is a fragmentary section of a modified form of ring.

Fig. 3 is a similar view showing a still further modification.

Fig. 4 is an axial section of another modification of the ring.

Referring to Fig. 1 of the drawing, 1 indicates the axle, the journal section of which engages the bearing 2 carried by the journal box, which latter is adapted to hold a body of oil in a well or reservoir in its bottom, which body of oil is traversed by a paddle or blade (not shown) which is attached to the end of the axle and is operative to pick up a portion of the oil and either allow the latter to drip onto the top of the bearing, or else throw the same against the top of the box by centrifugal force, whence it flows onto the top of the bearing. In this automatic lubrication of journal bearings, it is inevitable that particles of metal or other foreign material will be entrained in the oil in its movement from the reservoir to the bearing and back, and, unless these impurities are removed from the circulating oil, they will seriously impair the surfaces of the journal and the bearing and produce dangerous frictional heating effects.

Inasmuch as a relatively large proportion of the oil which drips from the journal and the bearing finds its way into the check ring secured to the axle, primarily for the purpose of preventing the escape of the oil along the axle, it has been found feasible to employ this check ring as a centrifugal separator for the oil and the impurities, without interfering with its normal function of preventing the escape of the oil.

The check ring as disclosed in Fig. 1 is substantially the same as that illustrated in the prior patent aforesaid, except that the latter makes no provision for effecting the centrifugal separation of the oil and solid impurities. According to the present invention, the device comprises an annular disk 4 adapted to be rigidly secured to the axle 1, the face of the disk toward the bearing being provided with two annular flanges substantially normal to the face of the disk, the inner flange 5 being of greater width than the outer flange 6, these flanges forming an annular pocket between them which serves the general purpose as described in the patent aforesaid. As the inner flange 5 extends over the bearing, it will be apparent that the oil dripping from the end of the bearing will fall upon the flange and will collect thereon until it overflows the lip 7 formed on the inner edge of the flange. If the axle 1 is rotating rapidly, the impurities in the oil collecting on the flange 5 will be driven by centrifugal force against the inner face of the flange, while the purified oil will eventually escape over the lip 7 and passing along the inner edge of said lip and flange, will be discharged by centrifugal force against the walls of the journal box. When the rotation of the shaft ceases, the solid material which has collected on the inner face of the flange 5 may be removed in any suitable manner. It will be seen that this arrangement provides what is, in effect, a centrifugal separator constituted by the ring disk which normally serves to prevent the escape of oil along the axle without, in any way, impairing the normal function of the disk or check ring.

As described in the patent aforesaid, the inner end of flange 5 is provided with an outwardly extending lip 8 which is tapered and provides a sharp edge from which the lubricant is forced by centrifugal action at high speed.

In the modification shown in Fig. 2, the outwardly extending lip 8' on the inner end of the flange 5 preferably extends beyond the periphery of the outer flange 6 and constitutes a knife-like peripheral lip which will facilitate the discharge of the oil when the speed of the shaft is reduced or when the oil becomes sluggish.

The form of device illustrated in Fig. 3 differs from that of Fig. 2, in that the lip 8" is considerably longer and is inclined toward the bearing. The greater peripheral diameter of this lip as well as the corresponding lip shown in Fig. 2 effects a greater relative peripheral speed of the knife edge of the lip and thereby renders the discharge of the oil from the knife edge more certain even at lower speeds of the shaft than would be possible with the form shown in Fig. 1, for example.

In these last two modifications, in case the peripheral speed of the rings is not sufficient to discharge the oil from the knife edges by centrifugal force, the oil not so discharged will pass into the annular chamber between the flanges 5 and 6 and will ultimately find its way back into the reservoir in the bottom of the axle box.

In Fig. 4, the check ring or disk is provided with only one annular flange 5', the inner edge of which is provided with an inner tapering lip 7', which, like the lips 7 in the other modifications, forms, with the inner wall of the flange 5 and the body of the ring proper, a circular pocket which will retain the oil entering the ring and effect the separation of the solid impurities from the oil by centrifugal force in the manner as hereinbefore described. The outer peripheral edge of the flange 5' is also provided with a tapered lip 8', which serves the same function as the similarly disposed lips in the other modifications, namely, to discharge the oil by centrifugal force from the edge of the lip when the axle and the ring are driven at high speeds and to permit the oil to drip from the lip when the speed is reduced materially.

What I claim is:

1. A device of the character described, comprising an annular disk, two annular flanges of different diameters projecting from and concentric with one face of said disk, and inwardly and outwardly extending tapered peripheral lips at the outer edge of the inner flange, the outwardly extending lip being of greater external diameter than the outer flange.

2. A device of the character described comprising a rotatable disk, two annular flanges of different diameters projecting laterally from said disk, and an annular lip on the inner flange extending outwardly beyond the inner face at least of the outer flange.

3. A device of the character described comprising a rotatable disk, an annular flange projecting laterally from said disk inwardly of the periphery thereof, and an annular lip extending outwardly from said flange in spaced relation to said disk and beyond the periphery thereof, said lip being inclined in the direction of its periphery away from said disk.

In testimony whereof I affix my signature.

GEORGES GRANDJEAN.